US005466096A

United States Patent [19]

Hilbish et al.

[11] Patent Number: 5,466,096
[45] Date of Patent: Nov. 14, 1995

[54] PRESSURIZED AIR CONVEYOR

[75] Inventors: Brian K. Hilbish; Arnold C. Burgess, both of Bedford; Michael A. Wilson, Big Island, all of Va.

[73] Assignee: Simplimatic Engineering Company, Lynchburg, Va.

[21] Appl. No.: 146,320

[22] Filed: Nov. 1, 1993

[51] Int. Cl.[6] .................................................. B65G 51/03
[52] U.S. Cl. ........................................ 406/84; 406/88
[58] Field of Search ................................ 406/84, 86, 88; 226/7, 97

[56] References Cited

U.S. PATENT DOCUMENTS

| | | | |
|---|---|---|---|
| 4,347,022 | 8/1982 | Lenhart | 406/88 |
| 4,369,005 | 1/1983 | Lenhart | 406/88 |
| 4,500,229 | 2/1985 | Cole et al. | 406/88 |
| 4,721,419 | 1/1988 | Lenhart | 406/88 |
| 4,730,955 | 3/1988 | Lenhart | 406/88 |
| 4,730,956 | 3/1988 | Lenhart | 406/88 |
| 4,732,513 | 3/1988 | Lenhart | 406/88 |
| 4,828,434 | 5/1989 | Fairman et al. | 406/88 |
| 5,122,016 | 6/1992 | Lenhart | 406/86 |
| 5,222,840 | 6/1993 | Ingraham et al. | 406/88 |

FOREIGN PATENT DOCUMENTS 285347 10/1988 European Pat. Off. ............ 406/86

*Primary Examiner*—David M. Mitchell
*Assistant Examiner*—Andrew C. Pike
*Attorney, Agent, or Firm*—St. Onge Steward Johnston & Reens

[57] ABSTRACT

An air conveyor is provided with a plenum chamber with a perforated deck plate, side walls, and a holddown with holes of an area density sufficiently low to pressurize an enclosed article transport zone. The side walls include brackets for mounting doors openable to remove damaged articles. The deck plate is mounted to support bars by countersunk rivets.

13 Claims, 5 Drawing Sheets

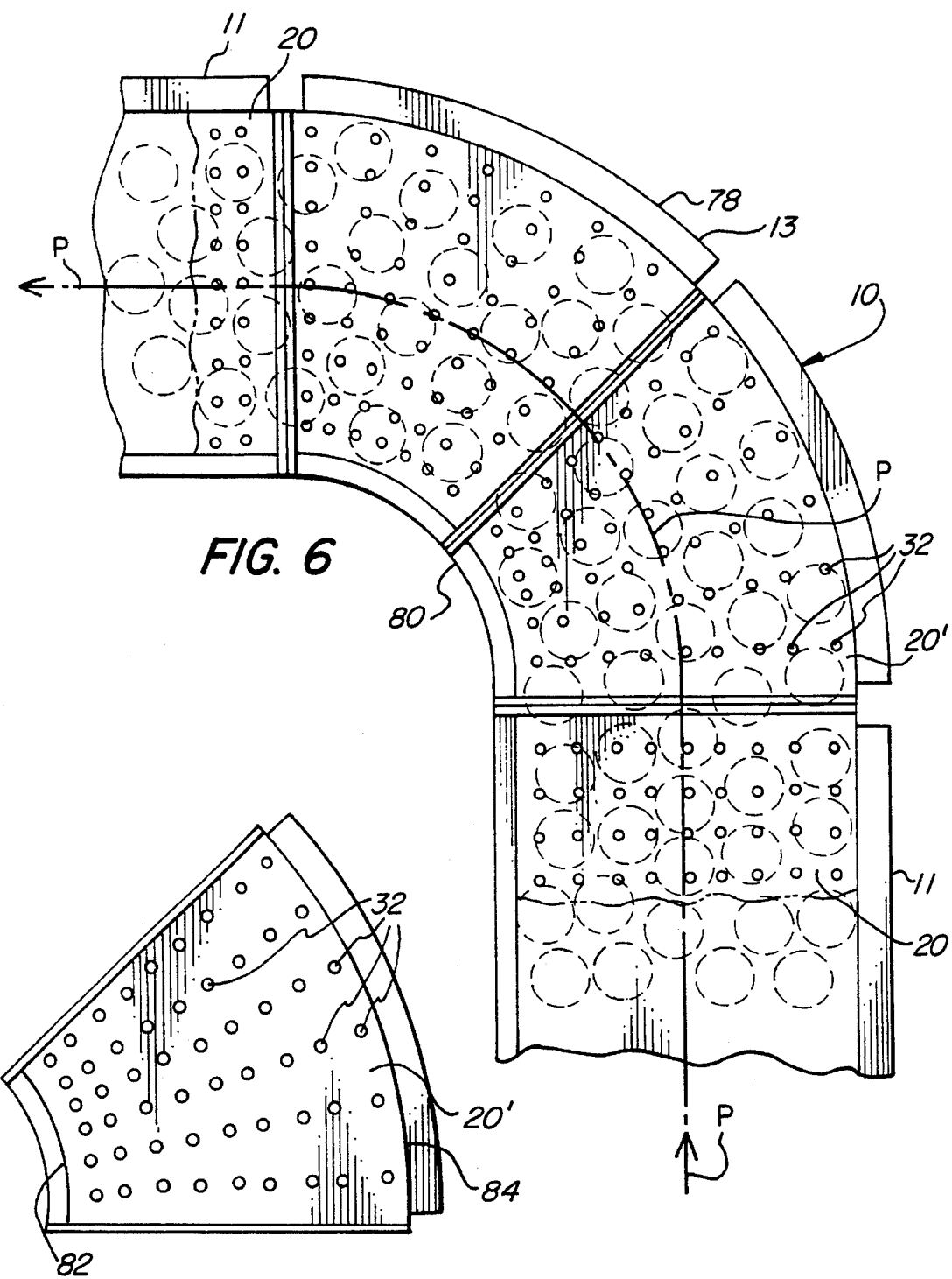

5,466,096

PRESSURIZED AIR CONVEYOR

FIELD OF THE INVENTION

The invention relates to air conveyors for transporting and accumulating articles such as cans, and more particularly to an air conveyor having a pressurized travel zone.

BACKGROUND OF THE INVENTION

Air handling equipment for performing a variety of functions on articles such as cans is known in the art. For example, systems are known for conveying (U.S. Pat. Nos. 4,369,005, 4,732,513, 4,828,434, 5,129,765, and 5,222,840), conveying and transferring (U.S. Pat. No. 5,037,245), conveying and single filing (U.S. Pat. Nos. 5,122,016, 4,730,955, 4,500,229, and 4,730,956), conveying and dividing (U.S. Pat. Nos. 4,347,022 and 5,009,550), and conveying and nesting cans (U.S. Pat. No. 4,721,419).

Virtually all of the known functions of air can handling equipment, examples of some of which are set out above, include some accumulation of cans or can contact. Can accumulation and contact is necessary in order that can lines operate with a substantially continuous flow of cans. This accumulation of cans, however, may cause can denting, requiring removal of the damaged cans and possibly leading to discontinuities in can line flow. Accumulation may also cause downed cans leading to jamming and damage of can line equipment. As food and beverage cans become thinner, plants are experiencing increasing numbers of damaged cans, especially as line speed increases, which exacerbates these can plant inefficiencies by necessitating more frequent line shutdowns to remove downed cans and repair jammed line equipment.

Further, curves in the conveyor line tend to cause unintended accumulation, and thus damage, as the articles tend to cling to the outer side of curved conveyor portions.

What is desired therefore is a can air conveyor which conveys cans at high speed yet permits accumulation or contact of cans without undue damage. An air conveyor which moves cans away from the outer side of curved portions and distributes them more evenly across the conveyor width is also desired.

SUMMARY OF THE INVENTION

Accordingly, it is an object of the invention to provide an air conveyor for articles such as cans which permits can accumulation without undue can damage.

Another object of the invention is to provide an air conveyor having a pressurized article transfer zone which slows moving articles as they approach stopped articles.

A further object of the invention is to provide an air conveyor of the above character which includes closed sides.

Yet another object of the invention is to provide an air conveyor of the above character which includes transparent sides for locating downed and damaged articles.

Still another object of the invention is to provide an air conveyor of the above character which includes a holddown having reduced hole area density as compared with prior art air conveyor holddowns to pressurize the article transparent area.

Yet a further object of the invention is to provide an air conveyor of the above character which includes a holddown on curved portions of the line having an increasing hole area density gradient from the outer toward the inner side of the curved portion to draw articles toward the inside of the curved portion.

These and other objects of the invention are achieved by provision of an air conveyor comprising a plenum chamber with a perforated deck plate, side walls, and a holddown with holes of an area density sufficiently low to pressurize an enclosed article transport zone. The sidewalls further comprise side brackets and doors openable to remove damaged cans. The doors are preferably made from a clear plastic such as LEXAN® so that damaged cans may be seen when the doors are closed. The side brackets include guide rails for guiding cans within the transport zone. Preferably, the guide rails are sealed to the holddown and deck plate. The deck plate is preferably assembled with countersunk rivets.

In curved portions, the holddown holes have an area density gradient which increases from an outer side toward an inner side of the curve to move articles away from the outer side.

In another aspect, the invention relates to a method of accumulating articles without undue damage comprising the steps of pressurizing the article transport area, deflecting air off a barrier back toward moving articles to slow them as they approach the barrier, stopping articles at the barrier and deflecting air off the stopped articles back toward moving articles to slow them as they approach the stopped articles.

In a further aspect, the invention relates to a method of reducing unintended accumulation at the outer sides of curved portions of the conveyor comprising the steps of pressurizing the article transport area, and moving articles from the outer toward the inner side of the curve by providing the article transport zone with air releasing holes having an area density gradient which increases from the outer toward the inner side of the curve.

The invention and its particular features and advantages will become more apparent from the following detailed description considered with reference to the accompanying drawings.

BRIEF DESCRIPTION OF THE DRAWINGS

FIG. 6 is a top plan view of a curved portion of the air conveyor of FIG. 1.

FIG. 7 is a top plan view of the hold down for a curved portion of the air conveyor of FIG. 1.

DETAILED DESCRIPTION OF THE INVENTION

Figure 8:
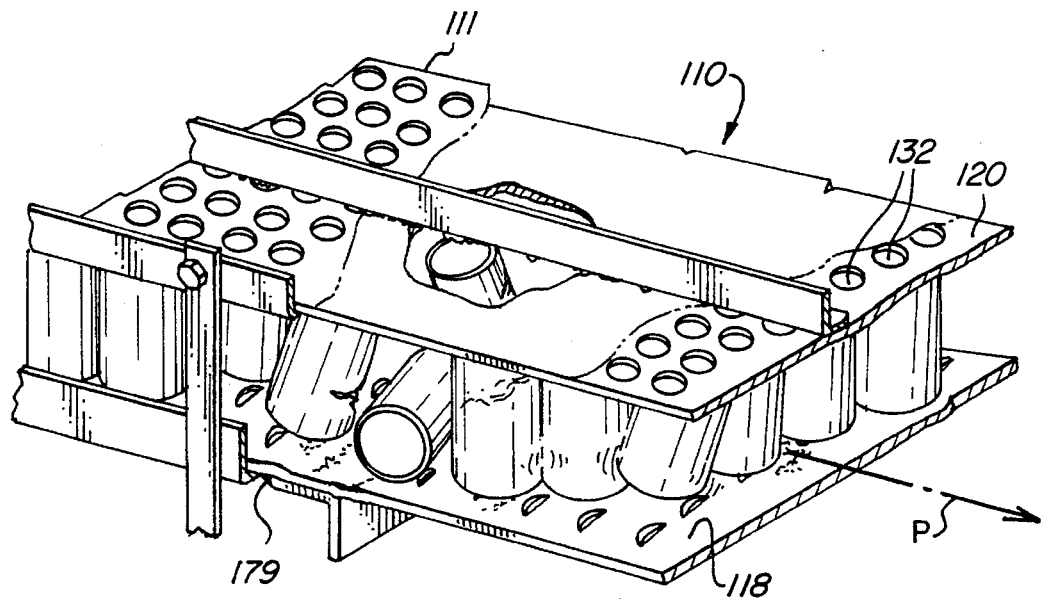
FIG. 8 is a partial front isometric view of a prior art air conveyor.
Figure 9:
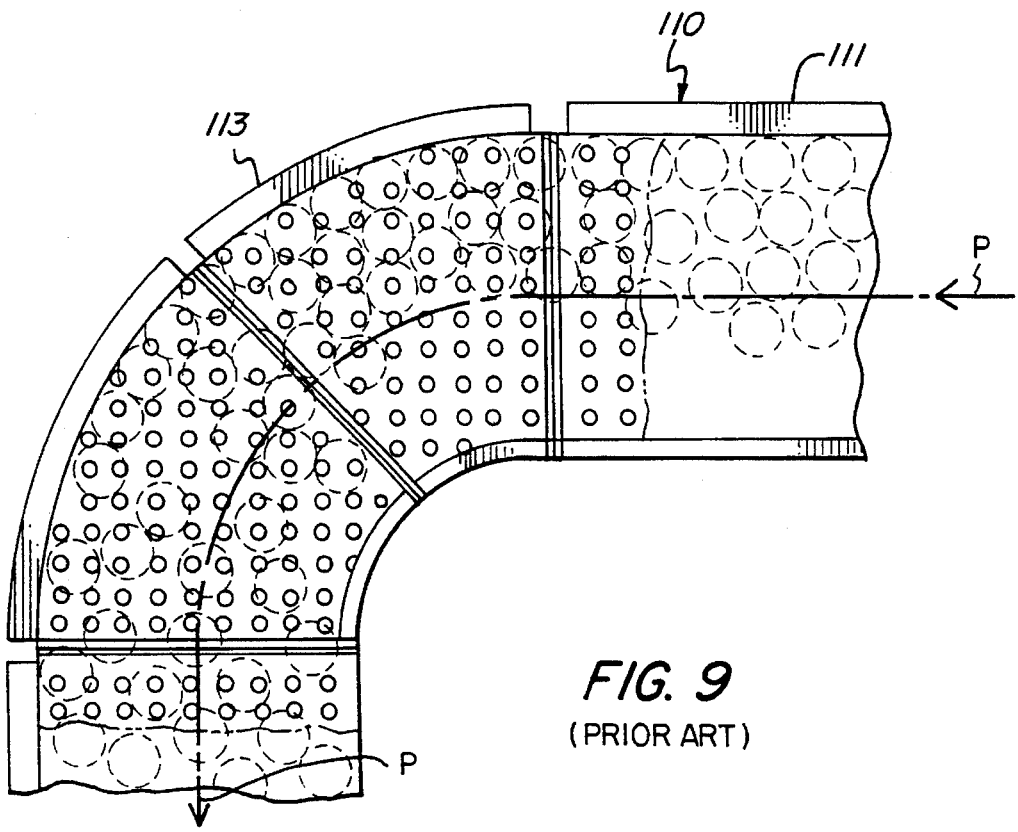
FIG. 9 is a top plan view of a curved portion of the prior art air conveyor of FIG. 8.

Air conveyor 10 in accordance with the invention includes straight portions 11 (FIGS. 1–5) and curved portions 13 (FIGS. 6–7). Air conveyor 10 is designed to overcome problems of prior art air conveyors 110 (having straight portions 111 (FIGS. 8–9) and curved portions 113 (FIG. 9)) illustrated in FIG. 8 depicting can damage upon accumulation and in FIG. 9 depicting unintended accumulation at outer sides of curved conveyor portions.

Figure 1:
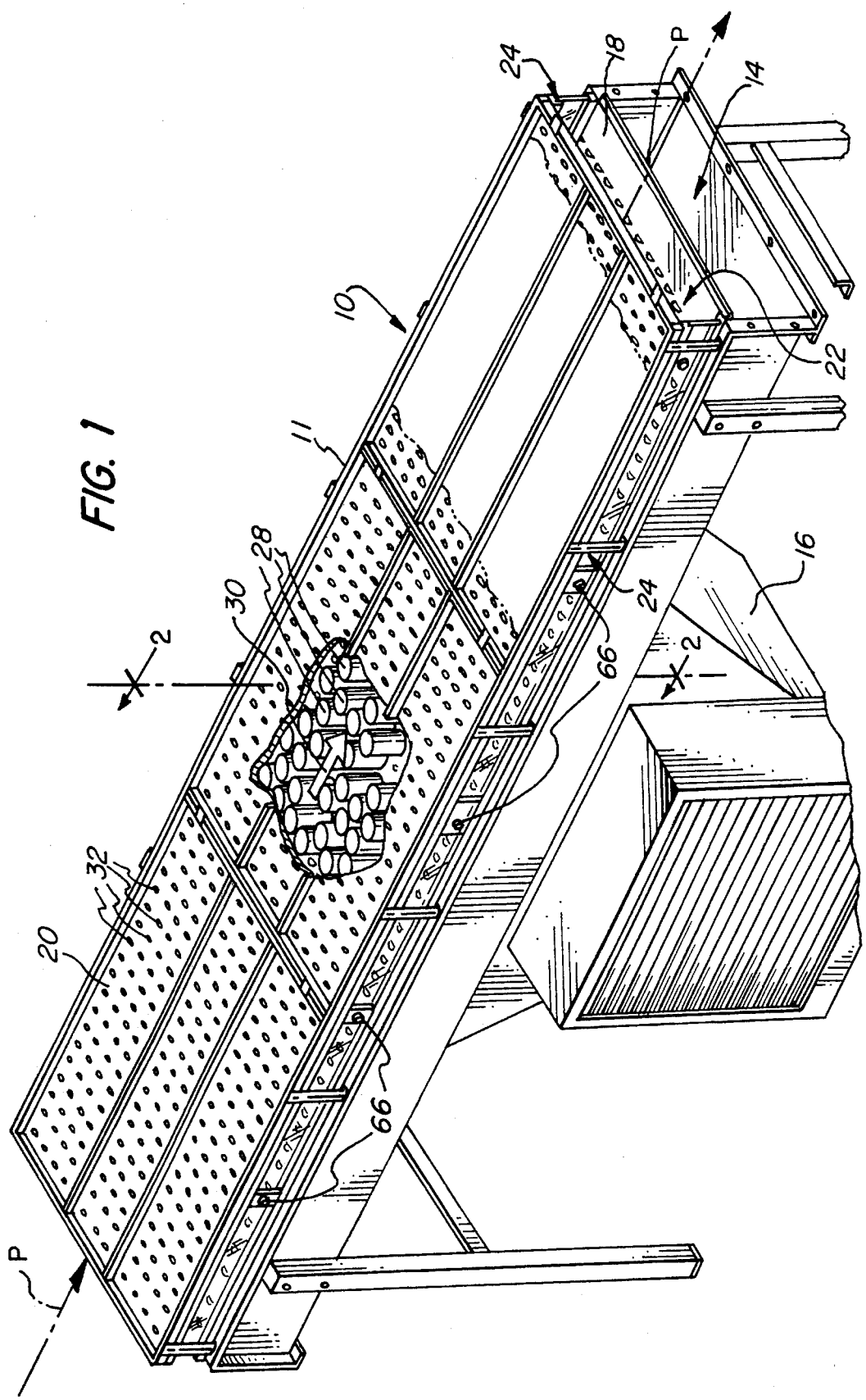
FIG. 1 is a front isometric view of a straight portion of an air conveyor in accordance with the invention.

Referring to FIG. 1, air conveyor 10 comprises a plenum chamber 14, a blower pod 16 such as that disclosed in U.S. Pat. No. 4,392,760, a deck plate 18 mounted on a side of plenum chamber 14, a holddown plate 20 spaced apart from deck plate 18 to form an article transport zone 22 therebetween, and side walls 24 for enclosing transport zone 22.

Figure 4:
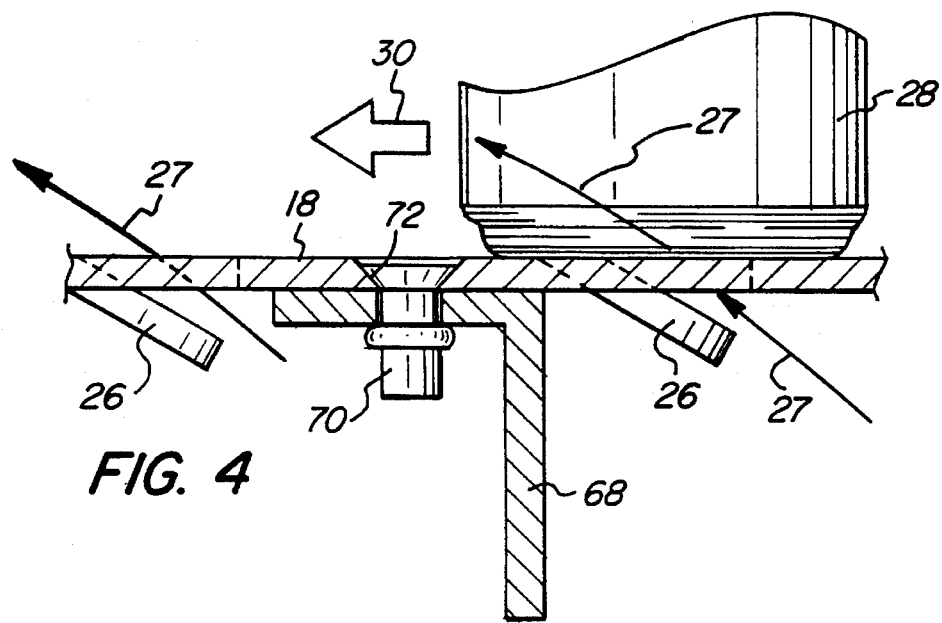
FIG. 4 is an enlarged partial side cross-sectional view of the air conveyor of FIG. 1 taken along plane 4—4 in FIG. 2.
Figure 3:
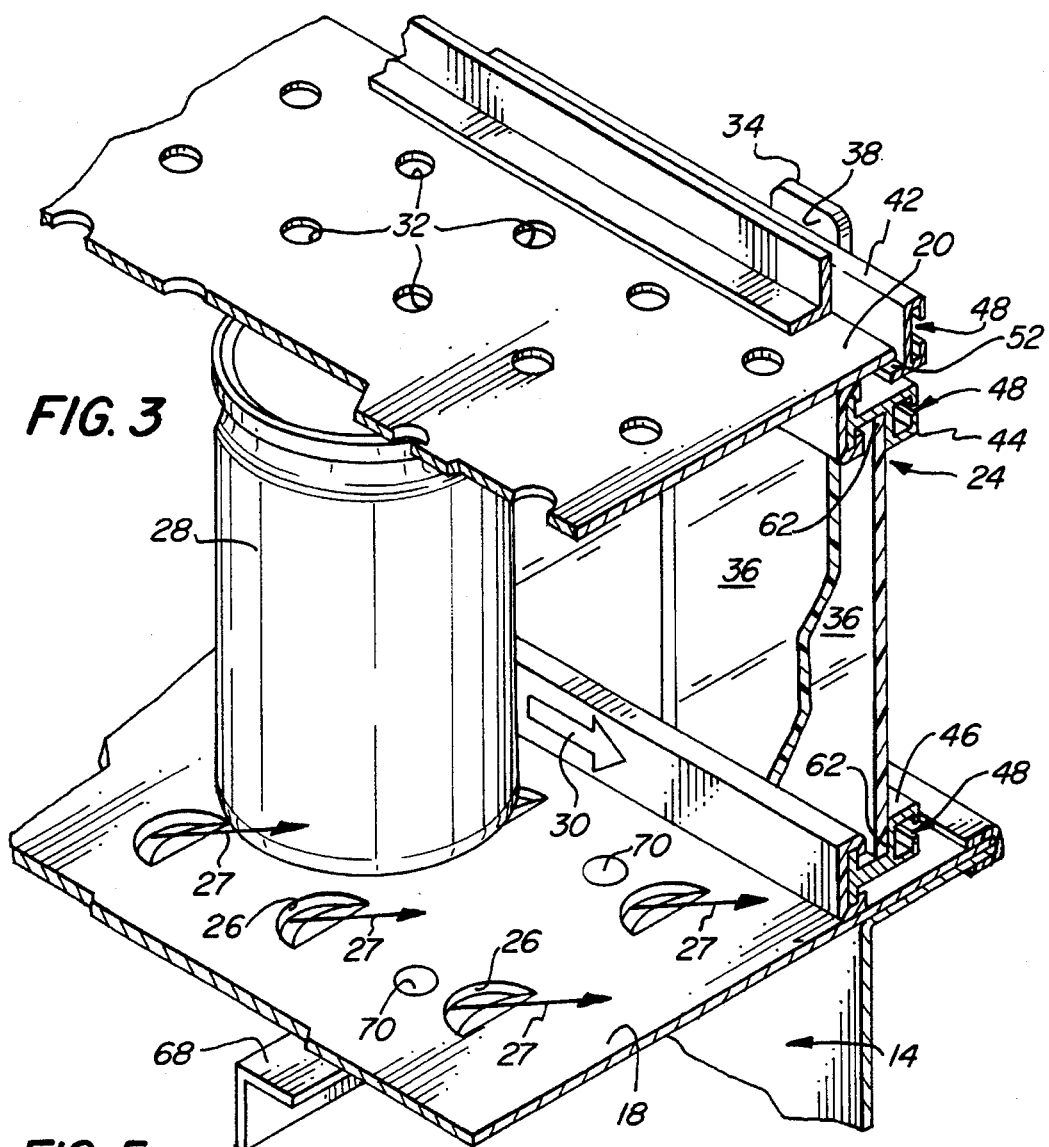
FIG. 3 is a partial front isometric view of the portion of the air conveyor of FIG. 1 which is illustrated in FIG. 2.
Figure 5:
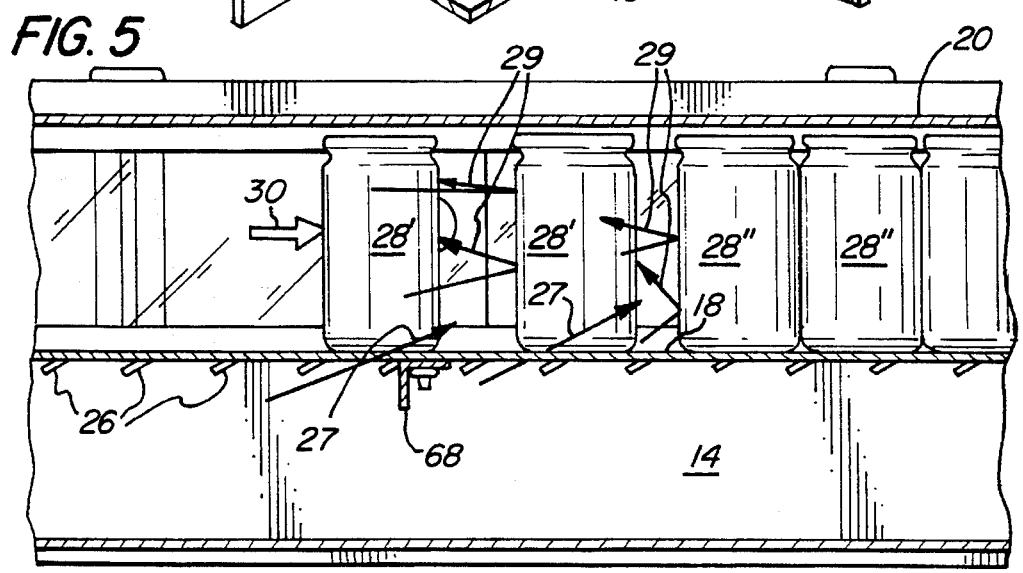
FIG. 5 is a side cross-sectional view of the air conveyor of FIG. 1 illustrating the slowing of moving cans as they approach stopped cans.

Deck plate 18 includes a plurality of holes or jets 26 for directing air, as indicated by arrows 27 in FIGS. 3–5, parallel to a conveyor path P along straight portions 11 and at a tangent to conveyor path P along curved portions 13 of air conveyor 10. Jets 26 move articles 28, such as cans, through transport zone 22 along path P as indicated by arrows 30 in FIGS. 1 and 3–5.

Figure 2:
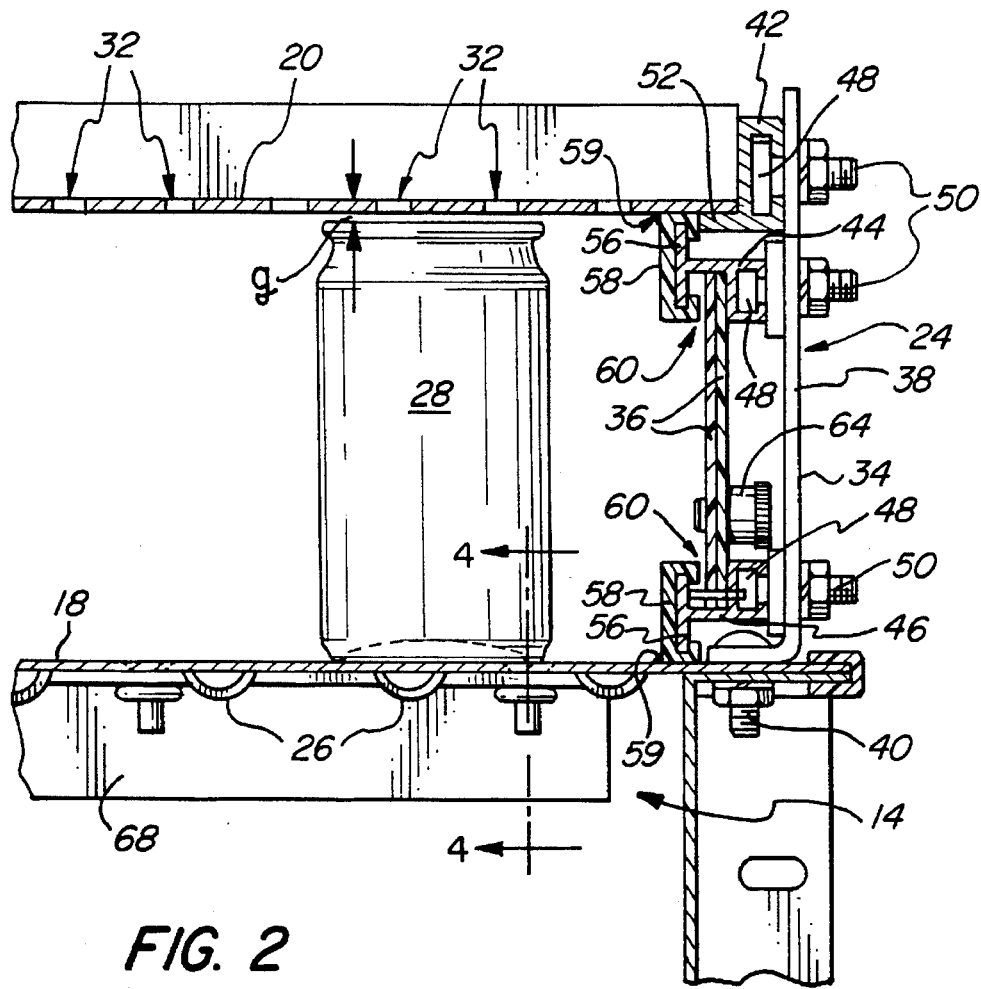
FIG. 2 is a partial end cross-sectional view of the air conveyor of FIG. 1 taken at the position and in the direction indicated by rector 2 in FIG. 1.

Holddown plate 20 functions as in prior art air conveyor 110 to prevent tipping of articles 28 by being mounted in close proximity to tops of articles 28 as illustrated by gap g in FIG. 2. Prior art holddowns 120 generally include a plurality of holes 132 having an area density of forty percent or greater, it being generally believed that ventilation of article transparent zone 122 was advantageous. By "area density" this is meant the area of holes or empty space relative to the total surface area.

The area density of holddown holes 32 of air conveyor 10, however, is reduced to a minimum amount sufficient to avoid the overbuilding necessary to contain a high pressure transport zone, while still providing a transport zone sufficiently pressurized to cause deflection of air from jets 26 back in the opposite direction of path P or of the tangent to path P, as indicated by arrows 29 in FIG. 5, to slow articles 28' as they approach a barrier which is deflecting the air.

It is understood that the barrier deflecting the air may comprise one or more articles 28" which have previously been slowed or stopped on the conveyor, as illustrated in FIG. 5, or may comprise a wall or gate or stop bar (not shown in any Figure) inserted into article transport zone 22 transverse to path P for the purpose of accumulating or diverting articles 28.

The area density of holes 32 depends upon how airtight article transport zone 22 is. With closed side walls 24, a holddown hole area density of between about two and eight percent, preferably about five percent, has been found to be sufficient. The area density of holes 132 of prior art holddowns 120 have been measured to be forty-seven percent.

Referring to FIGS. 2–3, the construction of sidewalls 24 is illustrated in additional detail. Sidewalls 24 generally include side brackets 34 and doors 36. Side brackets 34 comprise vertical members 38 mounted to deck plate 18 with a nut and bolt combination 40 (FIG. 2) and three extrusions or the like 42, 44, 46 mounted to vertical members 38 by integral T slots 48 and nut and bolt combinations 50.

Extrusion 42 includes an arm member 52 for receiving an edge of holddown plate 20. Extrusions 44,46 are preferably identical to reduce manufacturing costs and each includes a flange 56 for receiving a wearstrip 58, and a channel 60 for slidingly receiving an edge 62 of doors 36.

Upper and lower channels 60 of upper and lower extrusions 44, 46 form a slot for doors 36. Knobs 64 on doors 36 permit the doors to be slid open along the slot to remove downed or damaged articles 28. In this regard, doors 36 are preferably made from a clear plastic material such as LEXAN® so that downed or damaged articles 28 can be seen when the doors are closed.

Extrusions 44, 46 are so spaced along vertical member 34 such that guide rails 58 respectively seal at 59 to the lower surface of holddown plate 20 and the upper surface of deck plate 18. Returning briefly to FIG. 1, successive doors 36 slightly overlap when closed, as indicated at 66, such that side walls 24 are substantially sealed when doors 36 are closed.

Referring now to FIGS. 3 and 4, deck plate 18 is mounted to cross supports 68 with rivets 70 which are countersunk in holes 72 within the deck plate. By countersinking rivets 70, the upper transport surface of deck plate 18 remains fairly flat and smooth. In prior art conveyor 110 cross supports 68 were welded as indicated at 174. The heat required to weld prior art deck plates 118 often warp or bent them causing irregularities which may lead to can damage.

Referring to FIGS. 6 and 7, curved portions 13 of conveyor 10 include holddown holes 32 arranged with an area density gradient which increases from outer side 78 to inner side 80 of the curve. By "area density gradient" this is meant that the area density of holes 32 changes over the surface of curve holddown 20'. In particular, as illustrated in FIG. 7, the area density of holes 32 is greater near inner edge 82 of curve holddown 20' than it is near outer edge 84 of the curve holddown.

The greater the hole area density, the more air escapes from the pressurized article transport zone. The area density gradient thus causes a net flow of air from outer side 78 toward inner side 80 of curved portion 13. This flow of air moves cans 28 away from outer side 78 toward inner side 80 such that cans are more evenly distributed across deck plate 18 in curved portions 13 of conveyor 10 than in prior art air conveyor 110.

Although the invention has been described with reference to a particular arrangement of parts, features, and the like, these are not intended to exhaust all possible arrangements or features, and indeed many other modifications and variations will be ascertainable to those of skill in the art.

What is claimed is:

1. An air conveyor for articles comprising:

a plenum chamber having a deck plate on a side thereof;

a plurality of holes in said deck plate for directing air from said plenum chamber toward the articles to move them along a conveyor path;

a holddown plate mounted spaced apart from said deck plate to form an article transport zone therebetween;

side walls enclosing said article transport zone; and a plurality of holes in said holddown plate of an area density sufficiently low to provide a pressure within said article transport zone high enough to permit deflection of air directed from said deck plate holes off of stopped articles and back in a direction substantially opposite the conveyor path to slow moving articles as they approach the stopped articles; and wherein said deck plate is connected to support bars by a plurality of rivets countersunk into said deck plate.

2. The air conveyor of claim 1 wherein said side walls comprise side brackets and doors mounted to said side brackets, said doors being openable to remove damaged cans.

3. The air conveyor of claim 2 wherein said side brackets include a channel for slidingly mounting said doors therein.

4. The air conveyor of claim 2 wherein each said side bracket includes guide rails for guiding the articles conveyed within said article transport zone.

5. The air conveyor of claim 4 wherein said guide rails include an upper guide rail sealed to said holddown plate and a lower guide rail sealed to said deck plate.

6. The air conveyor of claim 1 wherein said side walls are transparent for locating damaged articles.

7. The air conveyor of claim 1 wherein said area density is between about two and eight percent.

8. An air conveyor for articles comprising:

a plenum chamber having a deck plate on a side thereof;

a plurality of holes in said deck plate for directing air from said plenum chamber toward the articles to move them along a conveyor path;

a holddown plate mounted spaced apart from said deck plate to form an article transport zone therebetween;

side walls enclosing said article transport zone, said side walls including side brackets and doors mounted to said side brackets, said doors being openable to remove damaged articles; and a plurality of holes in said holddown plate of an area density sufficiently low to provide a pressure within said article transport zone high enough to permit deflection of air directed from said deck plate holes off of stopped articles and back in a direction substantially opposite the conveyor path to slow moving articles as they approach the stopped articles.

9. The air conveyor of claim 8 wherein said side brackets include a channel for slidingly mounting said doors therein.

10. The air conveyor of claim 8 wherein each said side bracket includes guide rails for guiding the articles conveyed within said article transport zone.

11. The air conveyor of claim 10 wherein said guide rails include an upper guide rail sealed to said holddown plate and a lower guide rail sealed to said deck plate.

12. The air conveyor of claim 8 wherein said side walls are transparent for locating damaged articles.

13. The air conveyor of claim 8 wherein said area density is between about two and eight percent.

* * * * *